Patented Nov. 16, 1943

2,334,266

UNITED STATES PATENT OFFICE 2,334,266

DIAMOND ABRASIVE ARTICLE

Henry R. Houchins, Niagara Falls, N. Y., assignor to The Carborundum Company, Niagara Falls, N. Y., a corporation of Delaware No Drawing. Application February 2, 1939, Serial No. 254,231

10 Claims. (Cl. 51—308)

This invention relates to diamond abrasive articles including wheels and particularly to ceramically bonded diamond abrasive articles and the manufacture thereof.

This invention has among its objects the provision of an abrasive article containing diamond abrasive which is economical to make and use and in which the diamond abrasive is firmly bonded but so held as to permit rapid and efficient abrasion.

Diamond abrasives present certain problems in the manufacture of abrasive articles not encountered with other abrasives. Being harder than other known materials, their potential abrading life is longer; being much more expensive than other known abrasives, for the sake of economy, they must be utilized to the best advantage and consequently must be so used as to take advantage of their long potential abrading life. It is evident, therefore, that any bond that can advantageously be used for the bonding of diamond abrasive must hold the diamond particles in place until they have become dulled by use. Accomplishing this, however, is difficult because the surfaces of the diamond particles are not readily wettable and, in general, firm bonding is obtained only by wetting or reaction.

Ceramic bonds, and in particular glass bonds, may be used in accordance with the present invention as a solution to the difficulty mentioned above although proper precaution must be taken to prevent the oxidation or graphitization of the diamond abrasive at the relatively high temperatures necessary for maturation of these bonds.

I have found that glasses which have a low viscosity when molten and are very hard when solidified can be used in amounts up to 20 to 25% as bonds for diamond abrasive providing that a sufficient amount of filler or auxiliary abrasive material is present to react, at least partially, with the molten glass during maturation and mechanically hold or retain the diamonds within the skeletal structure thus formed. The low viscosity of the molten glass assists in wetting the abrasive particles and increases the ease with which the molten glass may flow into the crevices between the solid particles, while the hardness of the glass when solidified ensures strong bonding of the abrasive particles and imparts wear resistance to the article.

In carrying out my invention, according to one modification, I provide a mixture containing:

Example I

| | Per cent |
|---|---|
| Diamond abrasive (80 to 220 mesh, inclusive) | 40 |
| Fused alumina (400 mesh) | 40 |
| Powdered glass | 20 |

The above example is, of course, only one of many possible examples and is subject to considerable modification. Thus, the proportion and grit size of the diamond abrasive may be changed depending upon the use for which the article being made is designed; and the filler or secondary abrasive may be, instead of fused alumina, such materials as calcined bauxite, hard-burned porcelain grog, levigated alumina, and the like. The filler or secondary abrasive may also vary in grit size from that specified above although in general it will be found advisable to use a secondary abrasive or filler, the particles of which are at least as small as those of the diamond abrasive. The filler or secondary abrasive may also be used in varying proportions. As will be noted the fillers suggested above are to some extent reactive with fused glass. Such fillers during maturing, by reacting with the glass bond, form a skeletal structure which surrounds and holds the diamond abrasive. The powdered glass referred to in the above example may be one of those hereinafter mentioned, or other glass having similar suitable properties and should be finely enough ground to permit uniform mixing with the other ingredients of the mixture.

Another example of a mixture which is adapted to produce good glass-bonded diamond abrasive articles, such as grinding wheels, contains:

Example II

| | Per cent |
|---|---|
| Diamonds (80 to 150 mesh) | 10 |
| Fused alumina (200 mesh) | 70 |
| Powdered glass | 20 |

In this example also, modifications such as mentioned above in connection with Example I may be made.

In forming abrasive articles from mixtures such as those set forth in Examples I and II, a small quantity, for example 3% of the weight of the dry mixture, of dextrin or other suitable temporary binder, is added and thoroughly distributed throughout the mixture. The mixture is then wetted with a plasticizing liquid, such as water, and molded by any of the well-known ways, such as pressing, tamping and the like.

The molded articles, after drying, are burned at a temperature of approximately 600° C. in an oxidizing atmosphere for the purpose of removing all carbonizable material before the glass bond is fused. Following the removal of the carbonizable material, the articles are subjected to the higher temperature necessary to fuse the glass bond and cause it to flow around the solid particles of abrasive and filler. This burning or maturing must be performed without deleteriously affecting the diamonds and I accomplish this by burning the articles in a reducing or in a non-oxidizing atmosphere.

A reducing or non-oxidizing atmosphere may be provided in any of several ways, but I have found that a convenient way to produce satisfactory results is to place the articles in a box, crucible, or sagger of carbon and provide it with a carbon lid. The atmosphere existing in such a container at the high temperatures used will be found sufficiently reducing or at least non-oxidizing to prevent graphitization or oxidation of the diamond particles.

The following are analyses of glasses suitable for use in carrying out the present invention:

*Example III*

|  | A | B |
| --- | --- | --- |
|  | Per cent | Per cent |
| $SiO_2$ | 74.16 | 74.18 |
| $B_2O_3$ | 11.02 | 19.29 |
| $Na_2O$ | 12.03 | 3.76 |
| $K_2O$ | .09 | .09 |
| $CaO$ | .27 | .27 |
| $Al_2O_3$ | 2.02 | 2.07 |
| $As_2O_5$ | .36 | .36 |

These bonds mature at a temperature of approximately 1250° C., that is at that temperature their greatest strength is obtained.

Similar glasses within the following limits of composition have been found to be suitable bonds:

$SiO_2$ _____From about 70 to about 80%
$B_2O_3$ _____From about 11 to about 20%
$Na_2O$ _____From about 3 to about 13%
$Al_2O_3$ _____From about 2 to about 10%

Other types of glasses also may be used, the following being analyses of glass bonds maturing at approximately 1000° C.:

*Example IV*

|  | A | B |
| --- | --- | --- |
|  | Per cent | Per cent |
| $SiO_2$ | 56.0 | 49.0 |
| $B_2O_3$ | 8.7 | 12.1 |
| $Na_2O$ | 11.9 | 21.3 |
| $ZnO$ | 23.4 | 13.1 |
| $K_2O$ | ---------- | 3.5 |
| $Al_2O_3$ | ---------- | 1.0 |

Suitable glass bonds of this type can be made within the following range of compositions:

$SiO_2$ _____From about 45 to about 60%
$B_2O_3$ _____From about 8 to about 13%
$Na_2O$ _____From about 10 to about 23%
$Al_2O_3$ _____About 1%
$K_2O$ _____About 5%
$ZnO$ _____From about 10 to about 25%

Another type glass composition which may be used is obtained by the use of a frit which has an analysis approximately as follows:

*Example V*

|  | Per cent |
| --- | --- |
| $SiO_2$ | 70 |
| $B_2O_3$ | 20 |
| $Na_2O$ | 10 |

Eighty (80) parts of this frit when mixed with 20 parts of bentonite becomes a fused glass at 1300° C. and shaped mixtures of abrasive, filler, and the mixture of frit and bentonite will mature at that temperature into glass-bonded abrasive articles.

The foregoing examples of glass bonds are given as examples only and I do not intend that my invention shall be limited to the use of any particular glass composition described since any hard glass which is not reactive toward diamond and has a low viscosity at the maturing temperature of the article is suitable for my purpose.

I have given as examples glasses containing considerable proportions of boric oxide since I have found that the reduction in coefficient of expansion of the glass caused by the boric oxide results in the molten glass adhering better to the solid particles upon cooling and hence causes better bonding.

I have mentioned above that up to about 25% of glass may be used as a bond in making abrasive articles of the type described. If greater amounts than this are used the article is deformed because of the swelling or bloating effect of the gases given off from the fused glass which gases are unable to escape. Besides causing deformation of the article, the evolved gases cause an excessive vesicular structure which tends to weaken the article and to destroy its uniformity of structure.

This application is a continuation-in-part of my copending application Serial No. 170,860, filed October 25, 1937.

Having thus described my invention, I claim:

1. An abrasive article comprising diamond abrasive grain and a hard glass bond therefor, the glass bond being present in such an amount that swelling and bloating at its maturing temperature are substantially absent and having associated therewith a filler, in an amount substantially in excess of 10% and which reacts in part with said glass bond to form, upon maturing, a skeletal structure firmly holding the diamond abrasive.

2. An abrasive article containing abrasive grains comprising diamonds and a vitrified glass bond therefor containing, in combined form, approximately 70% to 80% $SiO_2$, approximately 11% to 20% $B_2O_3$, approximately 3% to 13% $Na_2O$, and approximately 2% to 10% $Al_2O_3$, said bond being present in an amount such that the article has a porous type of structure and relatively hard characteristics.

3. An abrasive article containing abrasive grain comprising diamonds and about 25% of a vitrified glass bond therefor, having an analysis approximating $SiO_2$ 74%, $B_2O_3$ 19%, $Na_2O$ 4%, $Al_2O_3$ 2%, other oxides 1%, said article having a porous type of structure and relatively hard characteristics.

4. As a new article of manufacture, a grinding wheel or other abrasive article comprising diamond granules bonded with a glass bond containing $B_2O_3$ which softens at a temperature of about 1250° C.

5. As a new article of manufacture, a grinding wheel or other abrasive article comprising diamond granules bonded with a ceramic bond including from 11 to not more than 20% $B_2O_3$.

6. As a new article of manufacture, a grinding wheel or other abrasive article comprising diamond granules bonded with a ceramic bond including from about 11 to not more than 20% $B_2O_3$ which bond softens sufficiently for bonding at a temperature of about 1250° C.

7. An abrasive article as set forth in claim 1 in which the glass bond contains a substantial proportion of $B_2O_3$.

8. An abrasive article as set forth in claim 1 in which the particles of filler are at least as small as the diamond abrasive grain.

9. As a new article of manufacture, a grinding wheel or other abrasive article comprising diamond granules and a reactive filler bonded with a glass bond containing $B_2O_3$ which softens at a temperature of about 1250° C.

10. As a new article of manufacture, a grinding wheel or other abrasive article comprising diamond granules and a reactive filler bonded with a ceramic bond including from 11 to not more than 20% $B_2O_3$.

HENRY R. HOUCHINS.